United States Patent [19]

Shuhart, Jr. et al.

[11] Patent Number: 5,065,251
[45] Date of Patent: Nov. 12, 1991

[54] METHOD AND APPARATUS FOR GRAPHICALLY MARKING AN AUDIOVISUAL RECORDING TO INDICATE OCCURRENCE OF AN OFFICIAL'S WHISTLE SIGNAL

[76] Inventors: Harvey A. Shuhart, Jr., 2100 Canterbury La., Jamison, Pa. 18929; Jay S. Gerber, 811 Triumphe Way, Warrington, Pa. 18976

[21] Appl. No.: 387,089

[22] Filed: Jul. 28, 1989

[51] Int. Cl.$^5$ .............................................. H04N 5/76
[52] U.S. Cl. .................................. 358/335; 358/310; 358/108; 369/27
[58] Field of Search ............... 360/6, 33.1, 10.1, 10.2, 360/10.3, 13, 14.1, 14.2, 14.3, 37.1, 19.1; 369/27, 29; 308/335, 41, 342, 311, 323, 908, 343; 358/108, 105

[56] References Cited

U.S. PATENT DOCUMENTS

| | | | |
|---|---|---|---|
| 3,611,333 | 10/1971 | Coniguliaro | 340/224 |
| 3,651,507 | 3/1972 | Abbott | 340/323 |
| 3,725,604 | 4/1973 | Alexander | 358/908 |
| 3,739,368 | 6/1973 | Stalp | 340/323 |
| 3,825,261 | 7/1974 | Zupos | 273/55 R |
| 4,162,449 | 7/1979 | Bouyssounovse et al. | 325/55 |
| 4,183,056 | 1/1980 | Evans et al. | 358/108 |
| 4,195,317 | 3/1980 | Stratton | 360/10.1 |
| 4,215,856 | 8/1980 | Schmall et al. | 272/3 |
| 4,390,904 | 6/1983 | Johnston et al. | 358/908 |
| 4,541,013 | 9/1985 | Alpert | 358/142 |
| 4,574,319 | 4/1986 | Konishi | 360/14.3 |
| 4,612,535 | 9/1986 | Sequin et al. | 340/539 |
| 4,613,831 | 9/1986 | Loftness | 331/78 |
| 4,618,895 | 10/1986 | Wright | 358/908 |
| 4,647,969 | 3/1987 | Graham, Sr. | 358/142 |
| 4,752,834 | 6/1988 | Koombes | 358/908 |
| 4,772,945 | 9/1988 | Tagawa et al. | 358/108 |
| 4,782,401 | 11/1988 | Faewber et al. | 358/908 |
| 4,943,854 | 7/1990 | Shiota et al. | 358/342 |

*Primary Examiner*—Roy N. Envall, Jr.
*Assistant Examiner*—Thai Tran
*Attorney, Agent, or Firm*—Eckert Seamans Cherin & Mellott

[57] ABSTRACT

A method and apparatus are provided to mark an audio-visual record of a sports event, such as an instant replay recording of a football game, with a preferably graphic indication of an official's whistle signal. An audio input device including at least one mobile transmitter to be worn by one or more of the officials picks up the whistle tone together with ambient sounds. The output of a receiver sensitive to an output of the mobile transmitter is discriminated for the official's whistle signal and may be further discriminated, by use of separate channels or by encoding, to determine which individual official blew the whistle. An encoder then produces a marker which is superimposed on the input to the audiovisual recording device such that the marker appears in the audiovisual record. The marker is readily noticeable in a playback of the record, apart from any representation of the signal otherwise appearing in the recording and facilitates judgments based upon the relative timing of the whistle tone and other events, such as fumbles, control of the quarterback by a tackler, downing of the ball and the like.

20 Claims, 3 Drawing Sheets

METHOD AND APPARATUS FOR GRAPHICALLY MARKING AN AUDIOVISUAL RECORDING TO INDICATE OCCURRENCE OF AN OFFICIAL'S WHISTLE SIGNAL

BACKGROUND OF THE INVENTION

1. Field of the Invention

This invention relates to the field of audiovisual recording apparatus such as used in "instant replay" telecasts of sports events, and in particular to an improved instant replay arrangement wherein a recording of the event is overlaid with an enhanced representation indicating detection of a signal at the event, especially overlaid by a graphic marker to indicate detection of the whistle tone of an official.

2. Prior Art

Instant replay telecasts are a familiar feature of televised sports events. In the known apparatus, whatever happens to be visible and audible to the spectators at an event is recorded using a number of television cameras or the like positioned at strategic locations around the area of play. The video and audio signals collected around the area are usually wired to a production facility such as a production trailer, at which a plurality of recordings are made and signals are switched such that a single output program is developed from the available collected signals. It is possible to replay the recordings made from one or more of the collected signals for broadcast. Recently, such replays have been used officially, at least on a trial basis, as a means to review a play and confirm or reverse an official's decision.

Typically, means in the form of mobile transmitters worn on the belts of the officials also collect an audio signal obtained at relatively close range to the sports action or to the conduct of matters of official procedure, at least when the mobile transmitter is activated by the official. This audio signal is normally integrated with the audio collected from other sources, such as sportscaster dialogue, crowd noise and signals developed using directional microphones directed at the players. The integrated signal including all the above sources, switched or mixed into a program, is broadcast to viewers. Portions of the integrated signal as well as recorded signals which have not been broadcast are available for playback as an instant replay. Instant replays are used such that viewers can review the play action to critique calls. The replays are used as well by the organizer of the event, to confirm officially the accuracy of decisions made by the officials that affect the outcome of the game. Instant replays are used in various sports events, however, the subject matter is discussed herein primarily with reference to the U.S. form of football. It will be appreciated that many of the same considerations apply to recordings of other events, including recordings of other types of sports event, non-sports events, etc.

In football as well as in other sports, official signals are employed to delineate certain phases of the game. In football, for example, the officials use a whistle to stop play when the ball is downed, when the quarterback is brought under control of an opposing tackler, when declaring certain penalties and in other situations. The precise timing of the whistle relative to occurrences on the field often is critical to determining the respective rights of the contending teams. For example, if the whistle is blown to indicate that the ball has been downed by tackling of the ball carrier and the ball carrier fumbles the ball during the tackle, a question is presented as to whether the fumble occurred before or after the whistle. If play officially was stopped by the whistle prior to the fumble, the ball of course cannot be recovered by the opposing team. A quarterback nearly in the grasp of a tackler will frequently attempt a quick pass to a receiver downfield, however, if the quarterback is considered to be under control of the tackler, then it is appropriate for the officials to stop play, again by blowing the whistle. In such situations, whether or not the whistle was blown prior to the critical event determines the outcome of the play.

It is difficult precisely to fix the time that a whistle was blown on the field when reviewing the known instant replay. The replay may be played back at a reduced speed to better view occurrences on the field, making any recorded audio unintelligible. Crowd noise and the sounds of players may interfere with receiving a clear whistle signal at the audio pickups disposed around the field. Normally, the officials do not leave their audio transmitters in the operative mode except when announcing a decision, penalty or the like. Moreover, there are a number of officials on the field with whistles. The respective locations of the officials varies relative to the play. The authority of particular officials in the heirearchy of officials also varies. Therefore, determining the precise time that a whistle was blown and the effect thereof when reviewing the replay has often been a matter of guesswork.

Various graphic displays, stop motion replays and other sophistications have been used to better present information to viewers or officiating reviewers of instant replays. Nevertheless, there has been no means apart from the audio signal of the whistle in the recorded replay, and the occurrence of officials' hand motions, which may or may not coincide with the whistle tone, to assist in fixing the timing of a whistle signal.

SUMMARY OF THE INVENTION

It is an object of the invention to fix automatically the time that a whistle signal or other signal applicable to a recorded event.

It is another object of the invention to enhance in a recording of an event perceptible attributes of a signal at the event.

It is still another object to provide a graphic marker in a recording to be employed as an instant replay or the like, accurately indicating the precise point, e.g., by marking the next video frame, at which the whistle or other signal commenced.

These and other objects are accomplished by a method and apparatus for marking an audiovisual record of a sports event, such as an instant replay recording of a football game, with a preferably graphic indication of an official's whistle signal. An audio input device including at least one mobile transmitter to be worn by at least one of the officials picks up the whistle tone together with ambient sounds. The output of a receiver sensitive to an output of the mobile transmitter is discriminated for the official's whistle signal and may be further discriminated, by use of separate channels or by encoding, to determine which individual official blew the whistle. An encoder then produces a marker which is impressed on the input to the audiovisual recording device such that the marker appears in the audiovisual recording. The marker is readily noticeable in a playback of the record, apart from any representation of the signal otherwise appearing in the recording, and facilitates judgments based upon the relative timing of the whistle tone and other events, such as fumbles, control of the quarterback by a tackler, downing of the ball and the like.

BRIEF DESCRIPTION OF THE DRAWINGS

There are shown in the drawings certain exemplary embodiments of the invention as presently preferred. It should be understood that the invention is not limited to the precise arrangements and instrumentalities shown in the drawing and is subject to other groupings of the respective parts and similar variations in accordance with the appended claims. In the drawings.

DETAILED DESCRIPTION OF THE PREFERRED EMBODIMENTS

Figure 1:
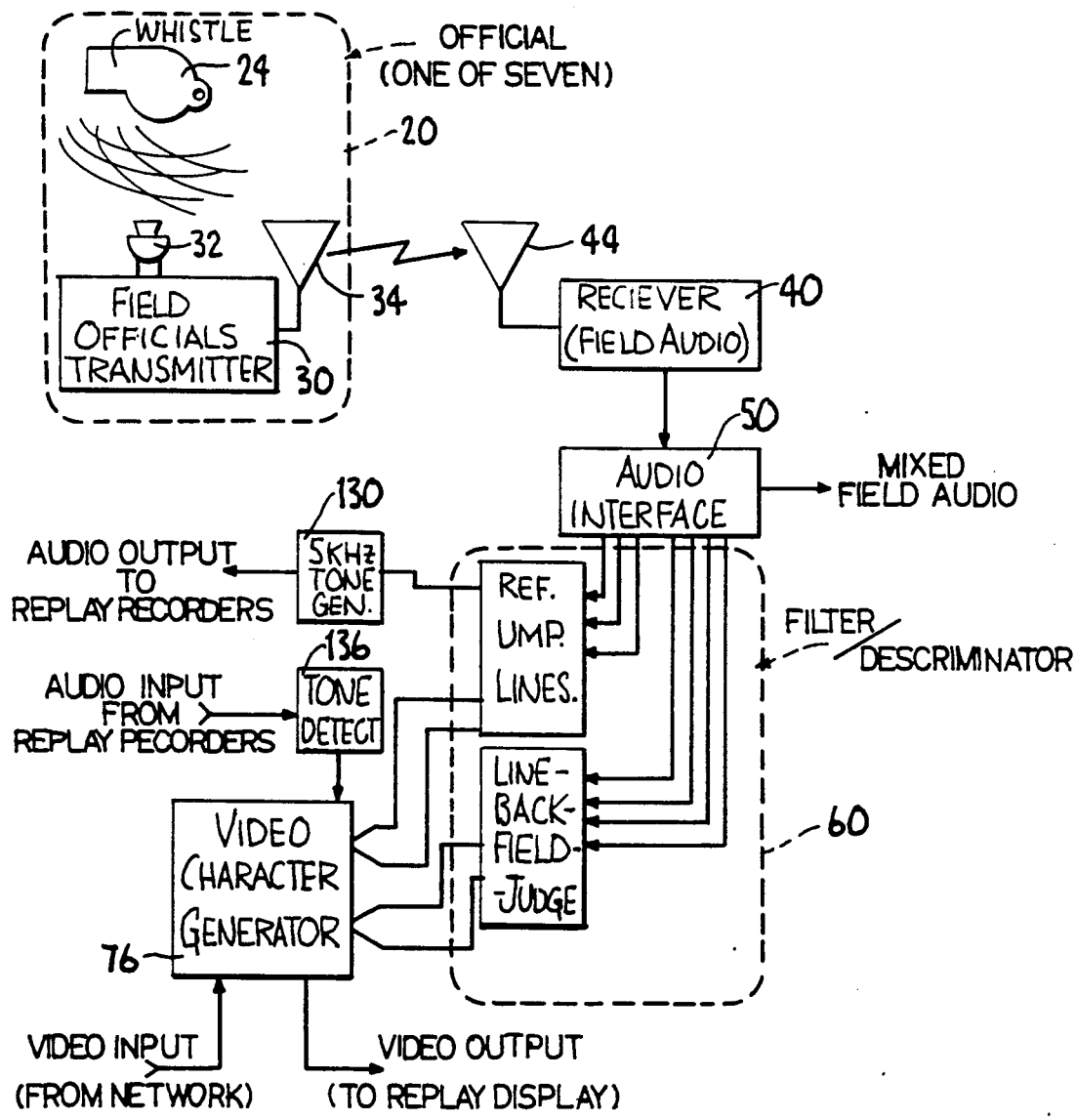
FIG. 1 is a block diagram showing a preferred embodiment of the apparatus for graphically marking an audio visual recording, in accordance, with the invention.

As shown in FIG. 1, the apparatus of the invention detects a signal generated by an official 20, who moves about on the playing field, and transmits an indication of the signal for inclusion of the recorded audio/visual program, whereby the program clearly indicates the point at which the signal was initiated, and preferably also indicates the particular official who raised the signal. In connection with the invention as applied to American football, the official 20 may be one of seven officials who is empowered in appropriate instances to sound a signal, normally stopping play. The invention is also applicable to other sports, non-sports events and the like. The present disclosure is primarily directed to football as an exemplary use for the invention.

The officials who oversee football games according to current rules include the referee, umpire, head linesman, line judge, back judge, side judge and field judge. The referee, umpire and head linesman are relatively higher in the heirarchy of officials, however, according to the preferred embodiment of the invention the whistle signals of any number of officials, preferably all the officials, are detected and graphically as well as audibly impressed on recordings of the event.

It is already known that the field officials may wear a belt transmitter 30, having a microphone 32 and transmitting a radio signal via antenna 34, such that the audio received at the official's location can be picked up and included in a replay program, broadcast program or the like. In departure from current practice, the invention contemplates the official 20 leaving the transmitter 30 active at all times that play is underway, such that any outputs from the official's whistle 24 which affect play will be picked up and displayed.

There is a possible anomaly in that if all the officials 20 have identical whistles 24, a whistle signal generated by one of the officials 20 may be transmitted by the transmitter 30 worn by another nearby official. It is possible to provide each of the officials with a whistle which generates a unique audio frequency. However, it is preferred that each of the officials have identical whistles, the respective sensing levels of the field official's transmitters 30 being set such that only a very close nearby whistle 24 will produce a sufficient audio level to trigger the detectors and thereby produce a graphic and/or enhanced audio indication of the whistle tone occurrence. In this manner, incidental audio signals produced, for example, by whistles held by fans, will not be transmitted to operative levels by the transmitters 30 of the field officials. In order to improve the selectivity of the device further, it is possible to boost the signal level by employing a microphone 32 which is wired to transmitter 30, providing the audio input to the field official's transmitter 30, collected immediately adjacent the official's mouth. A miniature microphone can be clipped to the official's shirt, e.g., near the collar, in the area nearby the operative location of the whistle.

Whistle 24 produces an audio frequency tone that varies somewhat around a center frequency, in the illustrated example about 3.72 KHz. The particular frequency of the whistle may vary, for example, with the power applied to blowing the whistle, with temperature, and possibly due to any tone variations caused by a movable ball inside the whistle, or the like. It will also be appreciated that during replay at slow speed, the frequency at which the audio whistle signal would be played back from a direct recording of the output, would be much lower, possibly at subaudible frequency. In any event the frequency of the replayed tone is variable due to variation of the playback speed.

Transmitter 30 produces a radio frequency output, for example, amplitude modulated or frequency modulated by the audio input at microphone 32. Transmitter 30 need only have a short range for a typical sports event, for example 300 meters.

Figure 3:
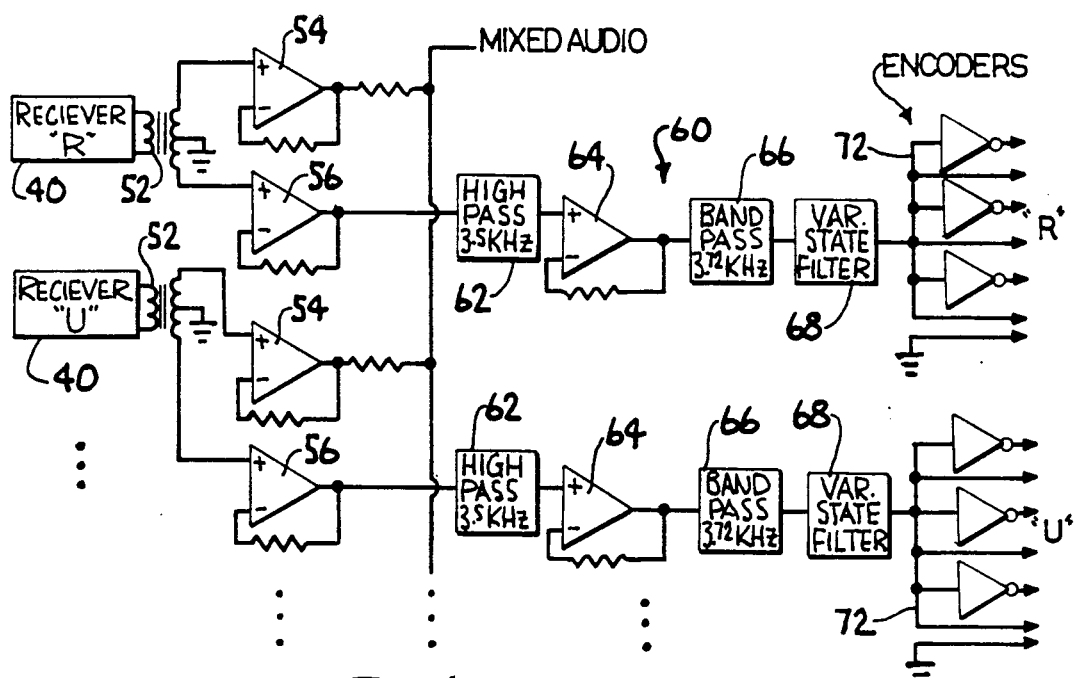
FIG. 3 is a schematic diagram showing connection of the field audio receiver, audio interface and filter/discriminator.
Figure 6:
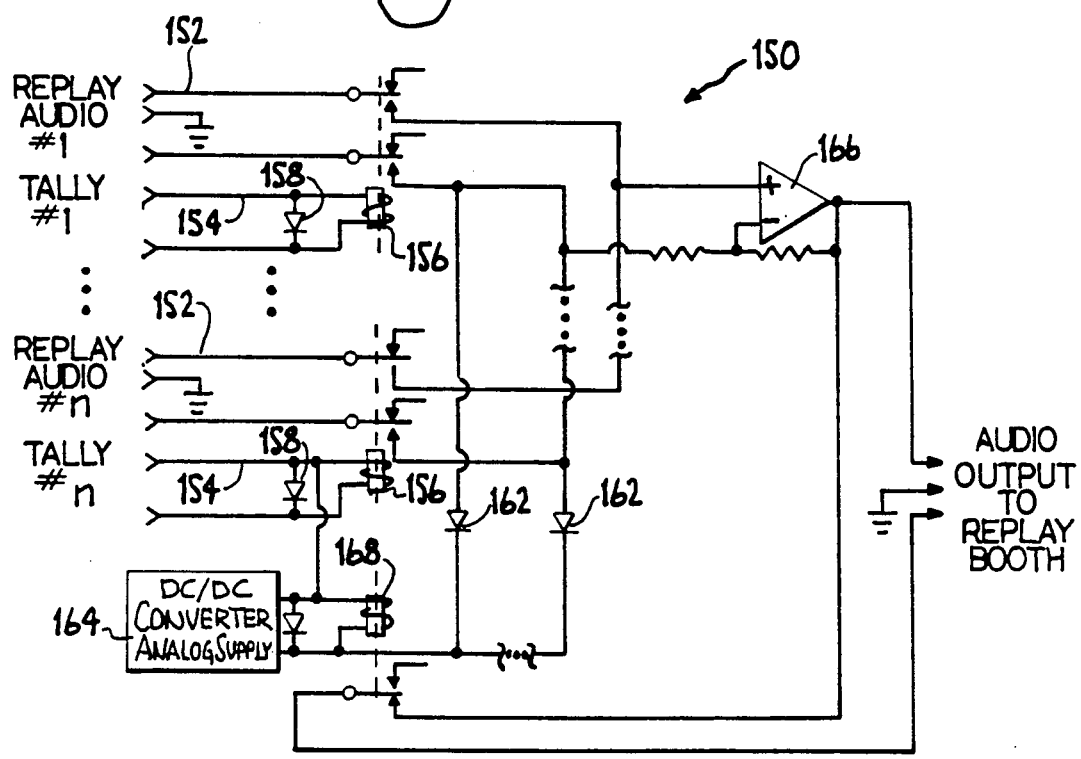
FIG. 6 is a schematic diagram showing the switcher arrangement for selecting active audio outputs.

Receiver 40 picks up the modulated radio frequency signal from field official's transmitter 30, via an antenna 44. Receiver 40 simply demodulates the received signal and provides an audio output electrically reproducing the collected whistle tone at the input to audio interface 50. The audio output at this point is useful in the same manner as already known, i.e., for providing a general purpose audio link from the official, to be heard in connection with explanations of penalties, called plays and the like. Moreover, audio interface 50 provides separate channel outputs for analysis by filter/discriminator 60, best shown in FIG. 3. FIGS. 3 and 6 illustrate only two channels, however, the invention is applicable to any number of channels, preferably at least one for each official. Two channels are shown for purposes of illustration and any additional channels may be included using parallel circuits, the same as those shown.

Each of the receivers 40 is responsive to the output of a different field official 20. This can be accomplished, for example, by employing different radio frequencies for transmission on unique channels from each of the field official's transmitters 30 to each of the field audio receivers 40. It is also possible to encode the signals of the individual officials uniquely by digital techniques and to decode the signals at a receiver, providing separate channel outputs for each of the officials 20 even if separate transmission frequencies are not used. Preferably, the receivers 40 are responsive to different radio frequencies.

The audio output of receivers 40 is coupled via a center tapped transformer 52 into two parallel audio amplifiers 54, 56 for each channel. Amplifiers 54, 56 may be operational amplifiers or the like. The output of one of the two parallel amplifiers 54, 56 is coupled by means of a series resistor to a mixed audio line, which provides a general purpose input to be recorded and/or used in the broadcast audio/visual program.

The other of the two amplifiers 54, 56 provides an input to a filter/discriminator 60 which includes audio frequency filtering for passing only the whistle tone such that an output signal can be triggered in the event a whistle signal is detected. Filter/discriminator 60, as shown in FIG. 1, has separate input lines from audio interface 50 for each of the officials. Separate output data lines are generated, in digital form, for input to a character generator 76, including means generating a graphic marker to be superimposed on the video signal for uniquely the output for each of the officials 20. Filter/discriminator 60 also triggers a tone generator 130 for example at 5 KHz, producing a standardized tone signal to be recorded. This tone signal upon replay can be detected by a tone detector 136, which will be explained more fully hereinafter.

Filter/discriminator 60 applies the output of individual channel amplifiers 56 to a high pass filter 62, for example having a half power point slightly below the expected frequency of the official's whistle. In the illustrated embodiment, the whistle provides an output centered at 3.72 KHz and the high pass filter has a half power point at 3.5 KHz. The output of the high pass filter 62 is amplified by a further amplifier 64, and applied to a band pass filter 66, centered at the expected frequency. The output of this filter is applied to variable state filter 68. Variable state filter 68 functions primarily as a threshold detector. However, the sensitivity of the threshold detection can be adjusted based upon the level of the background noise and the like to render the threshold detection dynamic. Variable threshold detectors are known in the art per se, for eliminating noise sensitivity. In any event, variable state filter 68 produces a digital output that is true when the audio output of receiver 40 has a signal level at or near the expected whistle frequency of 3.72 KHz of a desired amplitude, in view of the possibility of false triggering if the desired amplitude is too low. This digital output is applied to an encoder 72 for each of the channels, which encoder is connected to generate a parallel digital byte, addressing the required character at the input to video character generator 76. Inasmuch as whistle tones from seven officials 20 are to be encoded in the example, three bits are sufficient together with the required inventors to define the character, the three bits being produced by connecting the outputs of encoder 72 to the inputs of character input lines for video character generator 76 through the inventors, as necessary. Characters are normally completely defined in ASC11 by a full byte (8 bits) at the inputs to character generators, as known in the art. According to the invention, only three of the bits need to be varied in order to uniquely define the seven different officials. The remaining inputs can be hand-wired high or low. The outputs of encoder 72 may be connected separately to inputs of video character generator 76, or the outputs may be open collector outputs, connected to the inputs to character generator 76 via pull-up resistors, and time division multiplexed such that whistle signals on a plurality of the channels of the seven officials can be detected and displayed at the same time.

Figure 4:
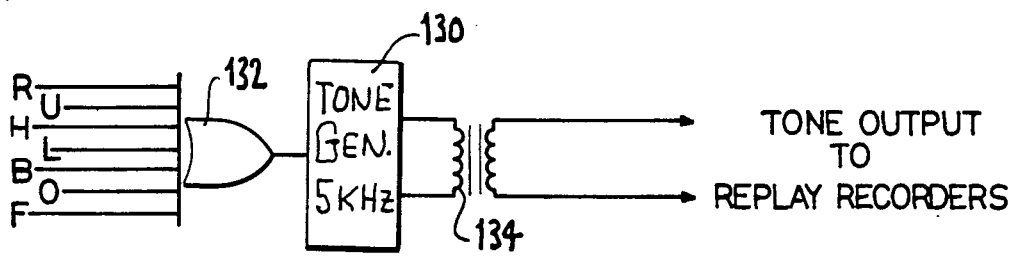
FIG. 4 is a schematic diagram showing the tone generator according to the invention.
Figure 5:
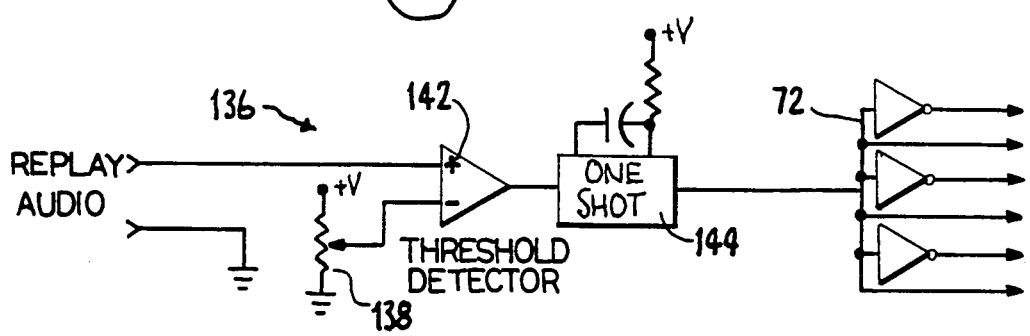
FIG. 5 is a schematic diagram showing the tone detector.

The outputs of the variable state filters 68 for each of the channels, designated in the drawings to refer to the officials by their initial letters ("RUHLBSF" for each of the Referee, Umpire, etc.) provide inputs to trigger a tone generator 130, as shown in FIG. 4. Tone generator 130 produces a standard audio frequency output, for example at 5 KHz, coupled to replay recorders via a transformer 134. These inputs RUHLBSF may be inputs to an OR gate 132 or similar logic means. Whenever any of the whistle signals are detected, the tone generator produces an output which is recorded. This output is then detectable upon replay of the recorded program as shown in FIG. 5. The replay audio line, which reproduces the recorded tone output of tone generator 130, is applied to a threshold detector defined by a comparator 142 with a level adjust input 138 at the inverting input. The replay audio frequency was recorded at 5 KHz, however, the playback may occur at any speed. Accordingly, no band pass filter is provided at the input to the tone detector 136. However, this section of audio either has the tone at an unknown frequency or silence. The output of comparator 142 produces an edge when the replay audio signal exceeds a level defined by the level adjust potentiometer 138, triggering a mono stable multi-vibrator ("one shot") 144, independent of tone frequency. The output of the one shot is applied to video character generator 76 in the same manner as the individual channels, i.e., by encoding certain bits of a byte on the character and position defining input lines to character generator 76. In the drawings, the specific bit patterns have not been shown, only the inverted and non-inverted lines being shown. These lines can be connected as required by means of jumpers or the like to define the desired code.

The encoded output of encoder 72 for tone detector 136 produce a character that is true at least momentarily whenever any of the officials' channels indicate an active whistle signal. This output, for example as encoded by an asterisk, can also be used to control other apparatus, for example game clocks and the like.

Figure 2:
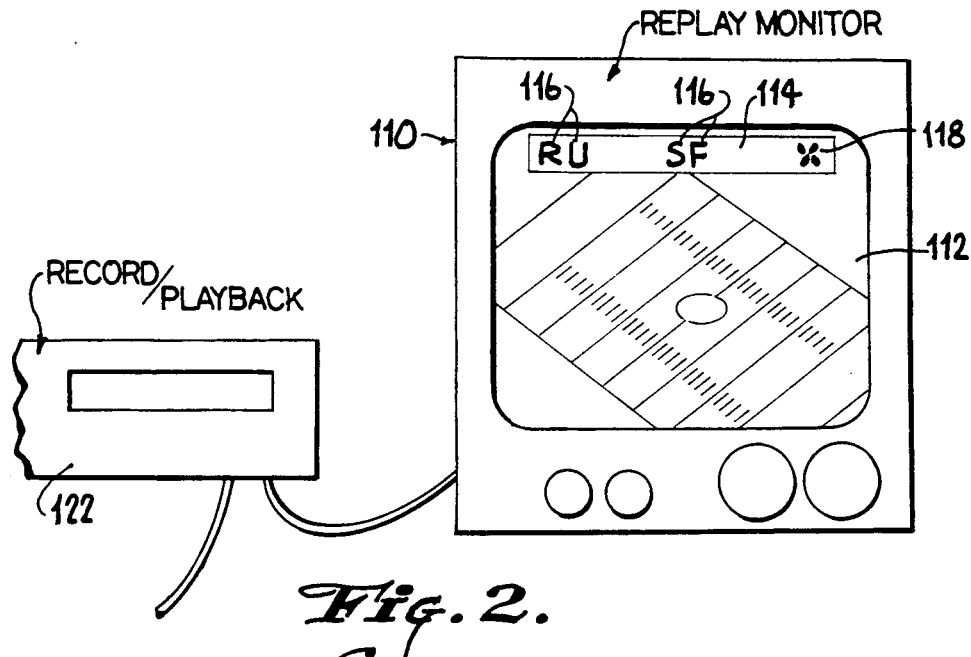
FIG. 2 is a schematic elevation view illustrating the replay monitor and record/playback apparatus.

Video character generator 76 is preferably applied between the video signal produced by the television network, usually switchable for insertion into the broadcast signal, and the input to the audio/visual recorder which will be used for generating instant replays and the like. As shown in FIG. 2, record/playback apparatus 122 is connected to a replay monitor. The replay monitor can be the official replay monitor, located in the replay booth at a game. Video character generator 76 modifies the video signal applied to record/playback apparatus 122, by including the characters identifying individual officials, and the character indicating the output of tone detector 136. These are preferably superimposed directly on the video image 112, however, it is also possible these signals could be displayed by separate means, for example signal lights provided around the casing of the replay monitor.

As shown in FIG. 2, a letter code indicating the particular officials, namely R,U,H,L,B,S and/or F, as well as the asterisk or the like, are displayed in a field area 114 in the video display. Asterisk 118 appears when any of the other characters appear, indicating detection of the signal from at least one whistle.

Inasmuch as the replay is recorded at video rates of 30 frames per second, the invention makes it readily possible at even the slowest frame-by-frame replay of the recording to find the precise point at which the official's whistle signal was first detected. The invention therefore eliminates any uncertainty as to the time of occurrence of the whistle and facilitates review of the replay and possibly review of decisions made by the officials on the field.

FIG. 6 illustrates a practical embodiment of the invention in connection with television production facilities having a plurality of record/replay apparatus 122. Normally, a number of audiovisual recordings are produced from the outputs of individual television cameras which are spaced at strategic points around the playing field. The production personnel decide when formating the signal to be broadcast to viewers, and also when sending a replay output to the replay booth, precisely which of the available camera outputs is to be used. Perhaps a number of the outputs must be viewed in order to analyze the situation from different perspectives. Production facilities including the record/playback apparatus are normally housed in a mobile trailer or the like, to which the individual cameras are wired. A control system for the production facility includes, in addition to the actual signal lines 152 including the audio signal as shown in FIG. 5, additional outputs, of which individual lines are powered for switching purposes when the corresponding playback apparatus 122 is enabled. According to the invention, this status indicating line 154 or "tally" line is used to power the coil of a relay 156, by which the replay audio line 152 of that particular recording device is connected through to the audio output sent to the replay booth. Replay audio and tally lines are provided for each of the record/playback channels, which may be as few as one or as many as a dozen or so, depending on the complexity of a particular production. These lines are connected as shown in FIG. 5 such that only one of the replay audio lines can be connected to the audio output to the replay booth as any one time. In addition to controlling the connection of the reply audio lines 152 to amplifier stage 166 by virtue of relays 156, an additional relay 168 is provided such that the entire switch mechanism 150 and the replay audio lines 152 applied thereto, are disconnected electrically from the audio output unless at least one of the replay audio lines 152 is active, as indicated by the corresponding tally input 154 for that line. In this manner, the respective audio lines 152, or any of them, do not remain connected to the audio inputs at the replay booth, producing unnecessary noise apart from the times at which the replay audio is functional. The overall switching mechanism is powered by a DC to DC converter, powered from the DC supply in the production trailer and operable to power relays 156, 158 through the diodes shown.

The invention is capable of a number of variations in accordance with this disclosure. The particular number of channels, frequencies, input and output particulars and the like can be varied. It is possible, for example, to sense a signal other than a whistle input signal, to change the type of whistle, perhaps to such that the whistle includes an inaudible component. The respective communication lines, disclosed respectively as radio communication links or wired links, can of course be hard wired. Multiplexing is possible to handle the signals for the respective channels in time divisions. The apparatus can be used for additional outputs besides display on a replay monitor, for example operating displays which are incorporated and broadcast signals, starting and stopping apparatus such as the game clock, and otherwise providing information regarding the status of various types of signals produced on the field.

The invention as disclosed herein is an apparatus for marking a recording of an event with an indication of an occurrence of a signal relating to the event, the recording being producible by means of a recording 122 device having input means 32, 30, 34 monitoring the event in at least one sensory form, the apparatus comprising an input device 32 for monitoring the event and for detecting the signal, means 30 for producing an output in response to detection of the signal at the input device, and an encoder 72, 76 producing a marker 116, 118 in the recording upon triggering by the output, the marker 116, 118 being readily noticeable in a playback 112 of the recording, apart from any appearance of the signal otherwise appearing in the recording.

The signal can be one of an audible and a visual signal occurring at the event and the recording is an audiovisual record of the event, the marker being one of a visible and an audible indication in the recording, respectively. The marker can be an enhanced representation of said one of an audible and a visible indication. The signal preferably is preferably primarily audible and the marker is a primarily visible mark 116, 118 in the recording. A discriminator 60 is operable to filter an output of the input device for attributes of the signal, the discriminator 60 being operatively connected along a signal path between the input device 32, 30 and the encoder 76. The signal can be an audible signal produced by an official's whistle 24 at a sporting event and the discriminator 60 includes a high pass filter.

A plurality of said input devices 32, 30 can be associated respectively with individual officials 20 at the sporting event or the like, the encoder 76 being operable to distinguish among signals of said individual officials. For example, the plurality of input devices can be assigned to different channels of a communications device along the signal path. Preferably, the input devices include audio transmitters 30 worn by officials 20 at the event, and means 72 may be included for uniquely identifying the output produced by individual ones of the input devices.

The invention may also be characterized as an apparatus for marking an audiovisual record of a sports event with an indication of an occurrence of an official's signal relating to the event, the recording being producible by means of an audiovisual recording device 122 having input means 32, 30 monitoring the event and producing the audiovisual record 112 of the event to be played back thereafter, the apparatus comprising an audio input device 32 including at least one mobile transmitter 30 to be worn by one of the officials 20, a receiver 40 sensitive to an output of the mobile transmitter, and means 62, 66, 68 for discriminating the official's signal in the output of the mobile transmitter, and an encoder 72, 76 producing a marker 116, 118 in the audiovisual record 112 upon detection of the official's signal by the means 62, 66, 68 for discriminating, the marker 116, 118 being readily noticeable in a playback of the record, apart from any appearance of the signal otherwise appearing in the recording. The official's signal may include an audible tone and the marker can be an enhanced representation 130 of said audible tone, or preferably, a visible mark 118 appearing at least momentarily in the audiovisual record.

The discriminator is disposed at one of the mobile transmitter 30 and the audiovisual recording device 60, 122. The official's signal preferably is produced by a whistle 24 and the discriminator 60 includes a high pass filter 62 operative to pass the official's signal. A plurality of said mobile transmitters can be associated with individual officials (RUHLBSF) at the sporting event, for example with the plurality of mobile transmitters 30 having outputs respectively assigned to different transmission channels.

The invention is likewise characterized as a method for recording an audiovisual record of an event for later playback, comprising the steps of operating an audiovisual recorder 122 to monitor the event and to produce an audiovisual record 112 thereof, detecting an occurrence of a signal at the event by producing an electrical signal having the signal represented therein, and discriminating for the signal in the electrical signal to produce a triggering output; encoding a marker 116, 118 responsive to the triggering output and impressing the marker on the audiovisual record 112, whereby the signal at the event is enhanced in the audiovisual record and relative timing of occurrences at the event can be readily compared to timing of the signal at the event. Preferably, the event is a sports event and the signal includes an audible signal produced by an official's whistle 24. The signal preferably includes a whistle tone and the step of detecting the occurrence of the signal includes discriminating for a characteristic feature of the whistle tone in an output of a mobile transmitter 30 carried by an official at the event.

The invention having been disclosed, a number of variations and additional embodiments will now become apparent to persons skilled in the art. Reference should be made to the appended claims rather than the foregoing specification in assessing the scope of exclusive rights claimed.

I claim:

1. An apparatus for marking a recording of an event with an indication of an occurrence of a signal relating to the event, the recording being producible by means of a recording device having input means linked to a plurality of input devices monitoring the event in at least one sensory form and transmitting data therefrom, the apparatus comprising:
   at least one input device for monitoring the event and transmitting data therefrom, and for detecting the signal;
   means for producing an output in response to detection of the signal at each of said input devices; and,
   an encoder producing a marker in the recording upon triggering by the output, the marker being prominently represented in at least one of audio and video media in a playback of the recording,
   wherein the signal is an audible signal occurring at the event and the recording is an audiovisual record of the event, the marker being one of audible and a visible indication in the recording, and wherein the marker is clearly displayed upon playback of the recording.

2. The apparatus of claim 1, further comprising a discriminator operable to filter an output of the input device for attributes of the signal, the discriminator being operatively connected along a signal path between the input device and the encoder.

3. An apparatus for marking a recording of an event with an indication of an occurrence of a signal relating to the event, the recording being producible by means of a recording device having input means linked to a plurality of input devices monitoring the event in at least one sensory form and transmitting data therefrom, the apparatus comprising:
   at least one input device for monitoring the event and transmitting data therefrom, and for detecting the signal;
   means for producing an output in response to detection of the signal at each input device;
   an encoder producing a marker in the recording upon triggering by the output, the marker being prominently represented in at least one of audio and video media in a playback of the recording, the signal including an audible signal produced by an official's whistle at a sporting event and the recording being an audiovisual record of the event, the marker including one of an audible and a visible indication superimposed in the recording, and the marker being clearly evident upon playback of the recording; and,
   a discriminator operable to filter an output of the input device for attributes of the signal, the discriminator being operatively connected along a signal path between the input device and the encoder.

4. The apparatus of claim 3, comprising a plurality of said input devices associated with individual officials at the sporting event, the encoder being operable to distinguish among signals of said individual officials.

5. The apparatus of claim 4, wherein the plurality of input devices are assigned to different channels of a communications device along the signal path.

6. The apparatus of claim 5, wherein the input devices include audio transmitters worn by officials at the event.

7. The apparatus of claim 4, wherein the plurality of input devices include audio transmitters worn by officials at the event, and further comprising means for uniquely identifying the output produced by individual ones of the input devices.

8. An apparatus for marking an audiovisual record of a sports event with an indication of an occurrence of an official's audible signal relating to the event, the recording being producible by means of an audiovisual recording device having input means monitoring the event and producing the audiovisual record of the event to be played back thereafter, the apparatus comprising:
   an audio input device including at least one mobile transmitter to be worn by one of the officials;
   a receiver sensitive to an output of the mobile transmitter, and means for discriminating the official's audible signal in the output of the mobile transmitter; and,
   an encoder producing a marker in the audiovisual record upon detection of the official's audible signal by the means for discriminating, the marker being prominently represented in at least one of audio and video media in a playback of the record.

9. The apparatus of claim 8, wherein the official's audible signal includes an audible tone.

10. The apparatus of claim 9, wherein the marker is an enhanced representation of said audible tone.

11. The apparatus of claim 9, wherein the marker includes a visible mark appearing at least momentarily in the audiovisual record.

12. The apparatus of claim 9, wherein the discriminator is disposed at one of the mobile transmitter and the audiovisual recording device.

13. An apparatus for marking an audiovisual record of a sports event with an indication of an occurrence of an official's audible signal relating to the event, the recording being producible by means of an audiovisual recording device having input means monitoring the event and producing the audiovisual record of the event to be played back thereafter, the apparatus comprising:
an audio input device including at least one mobile transmitter to be worn by one of the officials;
a receiver sensitive to an output of the mobile transmitter, and means for discriminating the official's audible signal in the output of the mobile transmitter;
an encoder producing a marker in the audiovisual record upon detection of the official's audible signal by the means for discriminating, the marker being prominently represented in at least one of audio and video media in a playback of the record;
the official's audible signal includes an audible tone; and,
the discriminator is disposed at one of the mobile transmitter and the audiovisual recording device.

14. The apparatus of claim 13, comprising a plurality of said mobile transmitters associated with individual officials at the sporting event.

15. The apparatus of claim 14, wherein the plurality of mobile transmitters have outputs respectively assigned to different transmission channels.

16. A method for recording an audiovisual record of an event for later playback, comprising the steps of:
monitoring the event through at least one input device in at least one sensory form and transmitting data therefrom;
operating an audiovisual recorder to produce an audiovisual record of the event from the data;
detecting an occurrence of an audible signal at the event by producing an electrical signal having the audible signal represented therein, and discriminating for the representation of the audible signal in the electrical signal to produce a triggering output; and,
encoding a marker responsive to the triggering output and impressing the marker on the audiovisual record;
whereby the audible signal at the event is enhanced in the audiovisual record and relative timing of occurrences at the event can be readily compared to timing of the audible signal at the event.

17. A method for recording an audiovisual record of an event for later playback, comprising the steps of:
monitoring the event through at least one input device in at least one sensory form and transmitting data therefrom;
operating an audiovisual recorder to produce an audiovisual record of the event from the data;
detecting an occurrence of an audible signal at the event by producing an electrical signal having the audible signal represented therein, and discriminating for the representation of the audible signal in the electrical signal to produce a triggering output;
encoding a marker responsive to the triggering output and impressing the marker on the audiovisual record; and,
the event is a sports event and the signal includes an audible signal produced by an official's whistle;
whereby the audible signal at the event is enhanced in the audiovisual record and relative timing of occurrences at the event can be readily compared to timing of the audible signal at the event.

18. A method for recording an audiovisual record of an event for later playback, comprising the steps of:
monitoring the event through at least one input device in at least one sensory form and transmitting data therefrom;
operating an audiovisual recorder to produce an audiovisual record of the event from the data;
detecting an occurrence of an audible signal at the event by producing an electrical signal having the audible signal represented therein, and discriminating for the representation of the audible signal in the electrical signal to produce a triggering output;
encoding a marker responsive to the triggering output and impressing the marker on the audiovisual record; and,
the signal includes a whistle tone and the step of detecting the occurrence of the signal includes discriminating for a characteristic feature of the whistle tone in an output of a mobile transmitter carried by an official at the event;
whereby the audible signal at the event is enhanced in the audiovisual record and relative timing of occurrences at the event can be readily compared to timing of the audible signal at the event.

19. The apparatus of claim 3, wherein the signal is an audible signal produced by an official's whistle at a sporting event and the discriminator is a high pass filter operative to pass the official's audible signal.

20. The apparatus of claim 13, wherein the signal is an audible signal produced by an official's whistle at a sporting event and the discriminator is a high pass filter operative to pass the official's audible signal.

* * * * *